United States Patent
Park et al.

(10) Patent No.: US 7,864,359 B2
(45) Date of Patent: Jan. 4, 2011

(54) DATA COMPRESSION AND DECOMPRESSION UNIT

(75) Inventors: Young-jin Park, Bucheon-si (KR); Yoon-tae Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1228 days.

(21) Appl. No.: 10/939,368

(22) Filed: Sep. 14, 2004

(65) Prior Publication Data

US 2005/0105125 A1     May 19, 2005

(30) Foreign Application Priority Data

Nov. 13, 2003   (KR)   ................. 10-2003-0080093

(51) Int. Cl.
*G06K 3/12*    (2006.01)
*G06K 15/00*   (2006.01)
*H04N 1/00*    (2006.01)
*G03F 3/08*    (2006.01)

(52) U.S. Cl. ............... 358/1.16; 358/1.15; 358/426.07; 358/1.17; 358/1.18; 358/523

(58) Field of Classification Search ............... 358/1.16, 358/1.18, 3.06, 426.04, 1.15; 382/232, 233; 710/22

See application file for complete search history.

(56) References Cited

U.S. PATENT DOCUMENTS

| | | | |
|---|---|---|---|
| 5,412,483 A * | 5/1995 | Ludlow et al. | 358/401 |
| 5,535,311 A * | 7/1996 | Zimmerman | 358/1.15 |
| 5,544,290 A * | 8/1996 | Gentile | 358/1.16 |
| 6,269,190 B1 * | 7/2001 | Mikkelsen et al. | 382/232 |
| 6,272,252 B1 * | 8/2001 | Eldridge et al. | 382/232 |
| 6,307,966 B1 * | 10/2001 | Chapin | 382/232 |
| 6,549,666 B1 * | 4/2003 | Schwartz | 382/233 |
| 6,559,969 B1 * | 5/2003 | Lapstun | 358/1.18 |
| 6,731,814 B2 * | 5/2004 | Zeck et al. | 382/239 |
| 6,809,832 B2 * | 10/2004 | Kubota | 358/1.16 |
| 6,983,072 B2 * | 1/2006 | Matherson et al. | 382/233 |
| 7,054,493 B2 * | 5/2006 | Schwartz | 382/232 |
| 2001/0052038 A1 * | 12/2001 | Fallon et al. | 710/68 |
| 2002/0038393 A1 * | 3/2002 | Ganapathy et al. | 710/22 |
| 2002/0069354 A1 * | 6/2002 | Fallon et al. | 713/2 |
| 2003/0025941 A1 * | 2/2003 | Schramm | 358/3.06 |
| 2003/0086125 A1 * | 5/2003 | Igarashi et al. | 358/426.04 |
| 2003/0123085 A1 * | 7/2003 | Kato | 358/1.15 |

\* cited by examiner

*Primary Examiner*—King Y Poon
*Assistant Examiner*—Akwasi M Sarpong
(74) *Attorney, Agent, or Firm*—Roylance, Abrams, Berdo & Goodman, L.L.P.

(57) ABSTRACT

A data compression and decompression unit that can enhance a data throughput during compression and decompression of data by dynamically allocating the sizes of the input and output buffers to the compression and decompression sections in accordance with a compressibility of data. The data compression and decompression unit includes a compression section that receives bit map data from a terminal, compresses the bit map data with a predetermined compressibility, and generates compressed data, and a decompression section that decompresses the compressed data into an original format, and generates decompressed data. The data unit further includes a memory section that stores the bit map data, the compressed data, and the decompressed data, and a control section that controls the compression and decompression in accordance with the predetermined compressibility.

16 Claims, 5 Drawing Sheets

(CONVNENTIONAL ART)

DATA COMPRESSION AND DECOMPRESSION UNIT

CROSS-REFERENCE TO RELATED APPLICATIONS

This application claims the benefit under 35 U.S.C §119(a) of Korean Patent Application No. 2003-80093 entitled "Data Compression And Decompression Unit", filed in the Korean Intellectual Property Office on Nov. 13, 2003, the entire contents of which are incorporated herein by reference.

BACKGROUND OF THE INVENTION

1. Field of the Invention

The present invention relates to a data compression and decompression unit. More specifically, the present invention relates to a data compression and decompression unit and method which can enhance data throughput of a compression section and a decompression section, without enlargement of input and output buffer sizes, by dynamically allocating parts of the input and output buffers in accordance with a data compressibility.

2. Description of the Related Art

In general, image forming apparatus such as printers, print images in a page unit at a high speed. Raw data such as bit map data of one or more pages are continuously stored in the printers, and the printers print the images on the basis of the bit map data.

However, since the amount of the bit map data can be excessively large, a large memory capacity is required, thereby increasing the cost of the printer. In order to prevent the increase in cost, a method has typically been used in which the bit map data transmitted from a terminal and similar devices, is compressed and the compressed bit map data is stored in a memory. The compressed bit map data can then be decompressed and read out from the memory when needed.

In this way, a greater amount of bit map data can be stored in a memory having the same size as the existing memory. In order to perform the compression and decompression of the bit map data, it is necessary to provide buffers for temporarily storing the bit map data before and after receipt by the memory.

Figure 1:
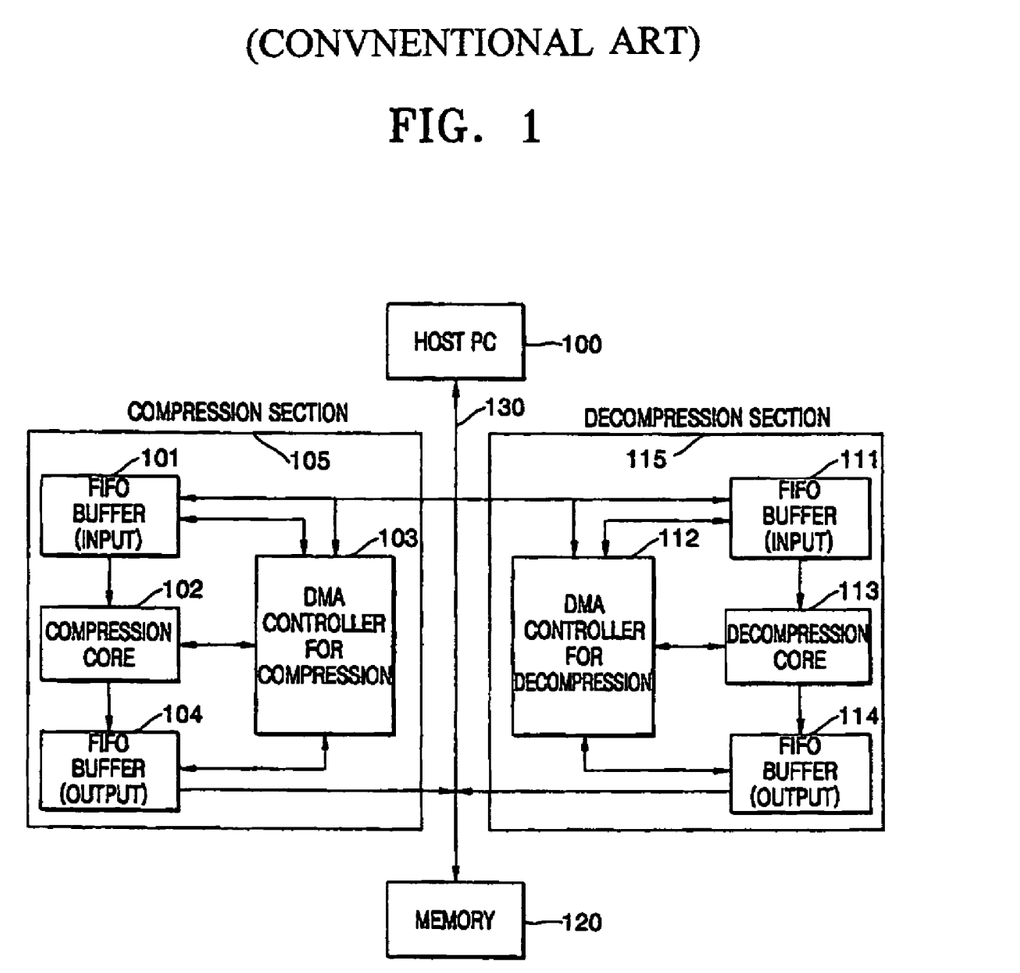
FIG. 1 is a block diagram illustrating a conventional data compression and decompression unit.

FIG. 1 is a block diagram illustrating a conventional data compression and decompression unit, where the conventional data compression and decompression unit comprises a compression section 105, a terminal 100, a memory 120, and a decompression section 115. The compression section 105 comprises an input first-in first-out (FIFO) buffer 101, a compression core 102, a direct memory access (DMA) controller 103 for compression, and an output first-in first-out (FIFO) buffer 104. The decompression section 15 comprises an input first-in first-out (FIFO) buffer 111, a decompression core 113, a direct memory access (DMA) controller 112 for decompression, and an output first-in first-out (FIFO) buffer 114.

A conventional method of compressing and decompressing bit map data will now be described with reference to FIG. 1.

When a user gives a command for printing documents prepared through application programs in the terminal 100, the documents are converted into the bit map data and are stored in the memory 120 through a system bus 130.

The compression core 102 then reads out the bit map data stored in the memory 120, temporarily stores the read-out bit map data in the input FIFO buffer 101, and then reads out and compresses the bit map data from the input FIFO buffer 101. The compressed bit map data is temporarily stored in the output FIFO buffer 104, and then stored in the memory 120. Thereafter, the large amount of bit map data transmitted from the terminal 100 is erased and only the compressed bit map data remains stored in the memory 120, therefore a large amount of data can be stored through such a compression.

The decompression core 113 then reads out the compressed bit map data stored in the memory 120, and temporarily stores the compressed bit map data in the input FIFO buffer 111. The compressed bit map data is decompressed by the decompression core 113, converted into the original bit map data, and is temporarily stored in the output FIFO buffer 114. Thereafter, the bit map data is stored in the memory 120, and then printed through a print engine (not shown).

The compression section 105 and the decompression section 115 include direct memory access (DMA) controllers 103 and 112, respectively, and thus read out data from the memory 120, or store data in the memory 120, by using a direct memory access method. The direct memory access method defines a method in which the data transmission is carried out directly between a memory and input and output units, without using a central processing unit (CPU).

In the conventional data compression and decompression unit, the decompression core must decompress the compressed bit map data in real time so as to print the bit map data corresponding to the maximum output speed of the printer. However, since the size of the input FIFO buffer 111 is restricted, a data throughput which can be processed in real time is restricted, even if the decompression core 113 carries out the decompressing operation at a high speed. Therefore, the maximum output speed of the printer is unavoidably restricted.

If the maximum output speed of the printer is raised excessively, an overrun phenomenon occurs. The overrun phenomenon is a phenomenon in which the printing speed exceeds the decompression speed, and data cannot be supplied to the printer when the printer is ready for printing.

Accordingly, in order to raise the printing speed of the printer through increases in data throughput, the sizes of the input FIFO buffer 111 and the output FIFO buffer 114 must be increased. However, the increase in buffer size results in not only increases in cost, but also increases in chip size for both the compression section 105 and the decompression section 115.

Accordingly, a need exists for a system and method which can enhance a data throughput during compression and decompression of data without increases in the size of input and output buffers.

SUMMARY OF THE INVENTION

Accordingly, the embodiments of the present invention provide a data compression and decompression unit and method which can enhance a data throughput during compression and decompression of data without increases in the size of input and output buffers. The unit and method enhances data throughput by dynamically allocating the parts of the input and output buffers to the compression and decompression functions in accordance with a compressibility of data.

According to an object of the present invention, a data compression and decompression unit is provided including a compression section that receives bit map data, compresses the bit map data with a predetermined compressibility, and generates compressed data. The unit further includes a decompression section that decompresses the compressed data into an original format, and generates decompressed data. The unit also includes a memory section that stores the bit map data, the compressed data, and the decompressed data, and a control section that controls the compression and decompression in accordance with the predetermined compressibility.

The compression section can include a first buffer that receives the bit map data stored in the memory section, and temporarily stores the received bit map data. The compression section can further include a compression core that reads out the bit map data stored in the first buffer, and generates the compressed data compressed with the predetermined compressibility. The compression section can also include a second buffer that temporarily stores the compressed data generated by the compression core before storing the compressed data in the memory section.

The decompression section can include a first buffer that receives the compressed data stored in the memory section, and temporarily stores the compressed data. The decompression section can further include a decompression core that decompresses the compressed data stored in the first buffer, and generates the decompressed data. The decompression section can also include a second buffer that temporarily stores the decompressed data generated by the decompression core before storing the decompressed data in the memory section.

The data compression and decompression unit can further include a direct memory access (DMA) controller, wherein the direct memory access controller can transmit data between the decompression section and the memory section by using a direct memory access (DMA) method.

The first buffer and the second buffer can be first-in first-out (FIFO) buffers, and the control section can read out the predetermined compressibility and allocate the first and second buffers to the compression and decompression sections in accordance with the predetermined compressibility.

The allocation of the first and second buffers can be carried out each time data compressed in a band unit is decompressed. The control section can allocate the first and second buffers exclusively to the compression section when printing operation of a printer engine is not yet started, allocate a part of the first and second buffers to the compression section and the decompression section in accordance with the predetermined compressibility when the printing operation is being performed, and allocate the first and second buffers exclusively to the decompression section when no bit map data is transmitted from the terminal.

The predetermined compressibility defines a compression ratio of the bit map data stored in the memory section and the compressed data. The predetermined compressibility can be added to a header portion of the compressed data, or can be stored in a storage portion of the compression section.

For example, the predetermined compressibility can be read out from a tag positioned in the header portion of the compressed data, or can be read out from the storage portion of the compression section.

According to another object of the present invention, a data compression and decompression method is provided for a data compression and decompression unit including a compression section that receives bit map data from a terminal, compresses the bit map data with a predetermined compressibility, and generates compressed data, and further includes a decompression section that decompresses the compressed data into an original format, and generates decompressed data. The unit also includes a memory section that stores the bit map data, the compressed data, and the decompressed data, and a control section that controls the compression and decompression in accordance with the predetermined compressibility. The method includes the steps of:

(a) storing the bit map data transmitted from the terminal in a memory section;

(b) reading out the bit map data stored in the memory section, compressing the read-out bit map data in a band unit, and storing the compressed data in the memory section;

(c) decompressing the compressed data stored in the memory section, and generating the decompressed data; and (d) storing the decompressed data in the memory section.

Step (b) can further include step (b-1) for calculating the predetermined compressibility between the compressed data stored in the memory unit and the bit map data, and step (b-2) for adding the calculated compressibility as a tag to a header of the compressed data.

Step (c) can further include step (c-1) for allocating a part of the first and second buffer to the compression section and the decompression section in the predetermined compressibility each time the compressed data is decompressed, and step (c-2) for decompressing the compressed data on the basis of the allocated parts of the first and second buffer, and storing the decompressed data in the memory section.

Step (c-2) can further include step (c-2-1) for receiving the compressed data from the memory section and storing the received compressed data in the allocated part of the first buffer, step (c-2-2) for decompressing the compressed data from the first buffer and storing the decompressed data in the allocated part of the second buffer, and step (c-2-3) for storing the decompressed data in the memory section.

In step (c-1), the first and second buffer can be allocated at the same ratio, and the first and second buffer can be first-in first-out buffers.

The ratio can be determined on the basis of experimental values, and the predetermined compressibility can be read out from the tag added to the header of the compressed data.

Step (b) can further include step (b-1') for calculating the predetermined compressibility between the compressed data stored in the memory section and the bit map data, and step (b-1') for storing the predetermined compressibility in a storage portion of the compression section. The predetermined compressibility can then be read out from the storage portion of the compression section.

As described above, embodiments of the present invention allow a unit to enhance data throughput during the compression and the decompression without enlargement of the first and second buffers by allocating the first and second buffer to the compression and the decompression in real time using a buffer size controller. In doing so, it is possible to raise the maximum output speed of a printer without an overrun phenomenon.

BRIEF DESCRIPTION OF THE DRAWINGS

The above and other features and advantages of the present invention will become more apparent from the following detailed description of exemplary embodiments thereof with reference to the attached drawings in which.

In the above figures, like reference numbers are used to refer to like features and structures.

DETAILED DESCRIPTION OF THE EXEMPLARY EMBODIMENTS

The present invention and operational advantages thereof can be fully understood by referring to the attached drawings and explanations thereof.

Exemplary embodiments of a data compression and decompression unit, and a data compression and decompression method according to the present invention, will be described in greater detail below with reference to the attached drawings.

Figure 2:
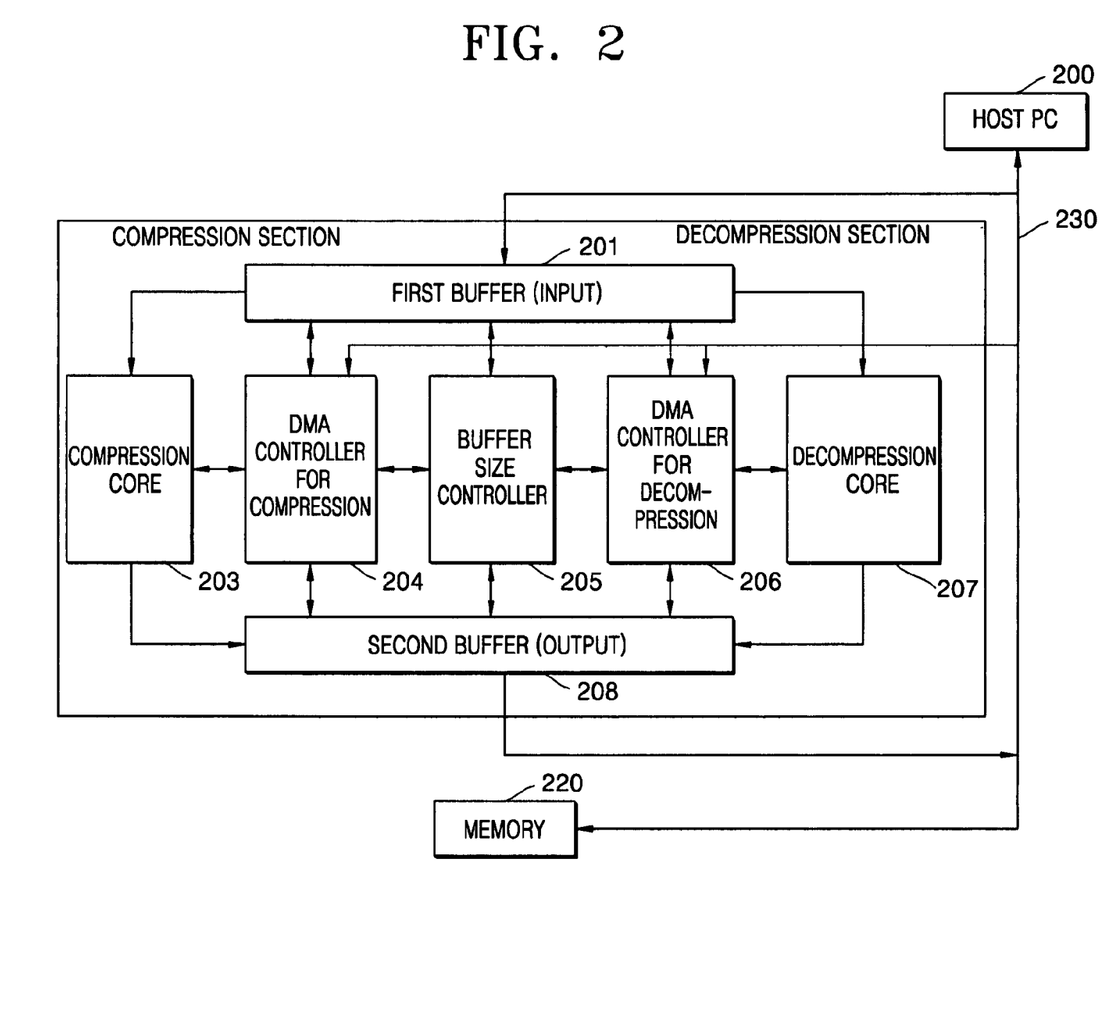
FIG. 2 is a block diagram illustrating a data compression and decompression unit according to an embodiment of the present invention.

FIG. 2 is a block diagram illustrating the data compression and decompression unit according to an embodiment of the present invention, wherein the data compression and decompression unit comprises a first buffer 201, a compression core 203, a direct memory access (DMA) controller 204 for compression, a buffer size controller 205, a direct memory access (DMA) controller 206 for decompression, a decompression core 207, a second buffer 208, and a memory 220.

Similar to the conventional unit of FIG. 1, the input first-in first-out (FIFO) buffer 201 in compression and the output FIFO buffer 208 in decompression, are shown as individual blocks. However, in the present invention, the first buffer 201 and the second buffer 208 are shared between compression and decompression sections, and are allocated to the compression core 203 and the decompression core 207 in compression and decompression sections in accordance with a predetermined compressibility as described in greater detail below. The first buffer 201 and the second buffer 208 are preferably first-in first-out (FIFO) buffers.

The data compression and decompression unit according to embodiments of the present invention is different from the conventional unit in that, the data compression and decompression unit further comprises the buffer size controller 205 which allocates areas of the buffers 201 and 208.

The data compression and decompression unit according to embodiments of the present invention will now be described in greater detail with reference to FIG. 2.

When a user gives a command for printing document data prepared in application programs of a host personal computer (PC) 200, the document data is converted into bit map data, and then stored in the memory 220 through a system bus 230.

The compression core 203 reads out the bit map data stored in the memory 220 and temporarily stores the bit map data in the first buffer 201. The compression core 203 further reads out the bit map data from the first buffer 201, and compresses the bit map data.

The compressed bit map data is temporarily stored in the second buffer 208, and then stored in the memory 220. Thereafter, the large amount of bit map data transmitted from the host PC 200 is erased from the memory 220, and only the compressed bit map data remains stored in the memory 220, such that a large amount of data can be stored in the memory 220 through such a compression.

The decompression core 207 reads out the compressed bit map data stored in the memory 220, and temporarily stores the compressed bit map data in the first buffer 201. The compressed bit map data is decompressed by the decompression core 207, converted into the original bit map data, and is temporarily stored in the second buffer 208. Thereafter, the bit map data is stored in the memory 220.

The compression section and the decompression section include direct memory access (DMA) controllers 204 and 206, respectively, and read out data from the memory 220 or store data in the memory 220 by using a direct memory access (DMA) method.

The compression section and the decompression section are included in one circuit, and share the first buffer 201 and the second buffer 208. The compression section comprises the compression core 203 and the DMA controller 204 for compression, and the decompression section comprises the decompression core 207 and the DMA controller 206 for decompression.

The buffer size controller 205 allocates areas of the first buffer 201 and the second buffer 208 in accordance with a compressibility of the compressed data each time the decompression operation is performed.

That is, when the compressibility of the compressed bit map data stored in the memory 220 is small, the buffer size controller 205 allocates most areas of the first buffer 201 and the second buffer 208 to the decompression section so as to enhance the data throughput of the decompression section. However, when the compressibility is large, the data processing can be sufficiently performed even if only a small area of the first buffer 201 in the decompression section is allocated to the compressed bit map data. Therefore, most areas of the first buffer 201 and the second buffer 208 can be allocated to the compression section, and in this case, the data throughput of the compression section can be enhanced. The first buffer 201 and the second buffer 208 are preferably FIFO buffers that perform a first-in first-out operation.

Figure 3:
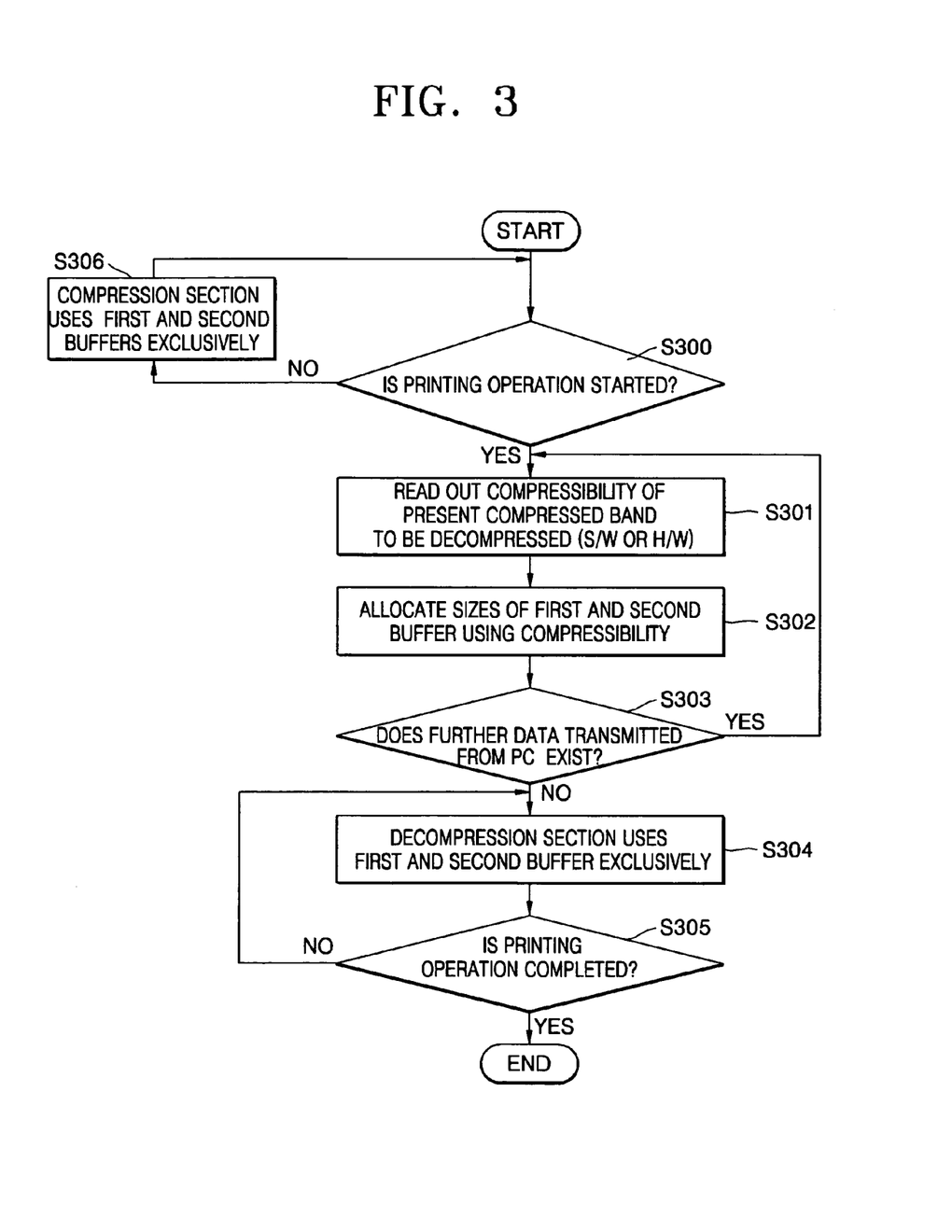
FIG. 3 is a flowchart illustrating a procedure for allocating a first buffer and a second buffer for data compression and decompression according to an embodiment of the present invention.
Figure 6:
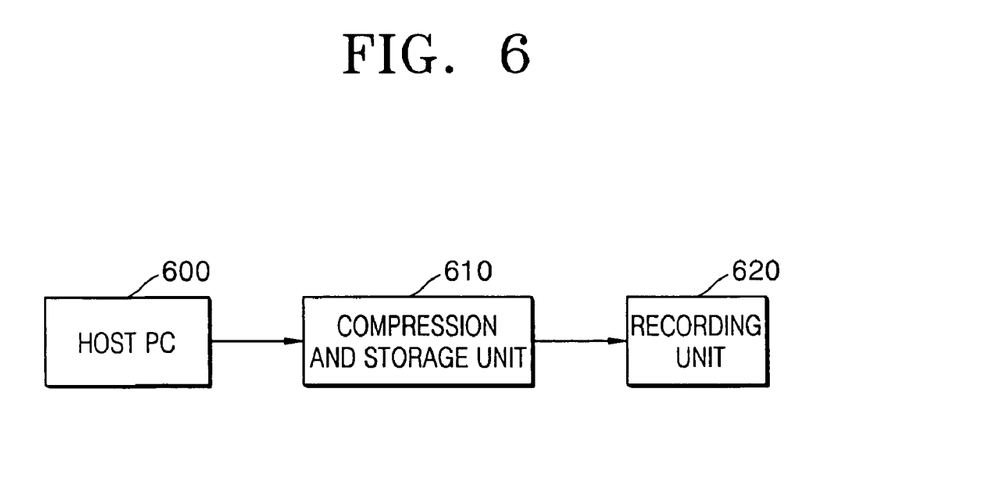
FIG. 6 is a block diagram illustrating a construction example of a printer system comprising the data compression and decompression unit according to an embodiment of the present invention.

FIG. 3 is a flowchart illustrating a procedure for dynamically allocating the area of the first buffer 201 and the area of the second buffer 208 for data compression and decompression according to an embodiment of the present invention. FIG. 6 is a block diagram illustrating a construction example of a printer system comprising the data compression and decompression unit according to an embodiment of the present invention, wherein the printer system comprises a terminal 600, such as a host personal computer (PC), a compression and storage unit 610, and a recording unit 620 such as a printer.

Referring to FIGS. 2, 3 and 6, the bit map data of documents prepared in application programs of the host PC (such as, 200 and 600) are stored in a memory in response to a user's printing command. Since a predetermined time is required for initializing the printer, the bit map data stored in the memory is not immediately printed. Therefore, until the printing operation is substantially started by means of a printing engine, the areas of the first buffer 201 and the second buffer 208 are naturally allocated to the compression section.

Therefore, the buffer size controller 205 judges whether the printing operation is started by the printer engine (not shown) in the recording unit 620 at step S300. When the printing operation is not yet started, the buffer size controller 205 allocates the first buffer 201 and the second buffer 208 exclusively to the compression core 203, such that the bit map data stored in the memory 220 is compressed and the compressed bit map data is successively stored in the memory at step S306. Here, the compression and the decompression are carried out in a band unit, and one band includes several lines.

When the printing operation is started by means of the printing engine (not shown), the buffer size controller 205 reads out the compressibility from the compressed bit map data stored in the memory 220. The compressibility can be obtained by calculating a ratio of the bit map data as raw data and the compressed bit map data after the compression of the bit map data in a band unit is completed in the compression section.

Two methods of obtaining the compressibility of the compressed data can be provided by embodiments of the present invention, including a hardware method and a software method.

The hardware method can be provided as a method in which the compressibility can be read out by adding information on the compressibility of each band as a tag to a header portion of the compressed data after the compression of data in a band unit is completed. Therefore, the header portion of the compressed data of each band includes a tag having the information on the compressibility. The buffer size controller 205 can then read out the compressibility of each band by referring to the header portion of each band in decompression.

The software method can be provided as a method in which an interrupt is generated each time the compression of data in a band unit is completed by the compression section, wherein the compressibility of each band is calculated through a predetermined interrupt routine, and the compressibility of each band is sequentially stored in an inner register (not shown) in the compression section. The compressibility of each band stored sequentially can be read out by the buffer size controller 205 during compression of each band.

Figure 4:
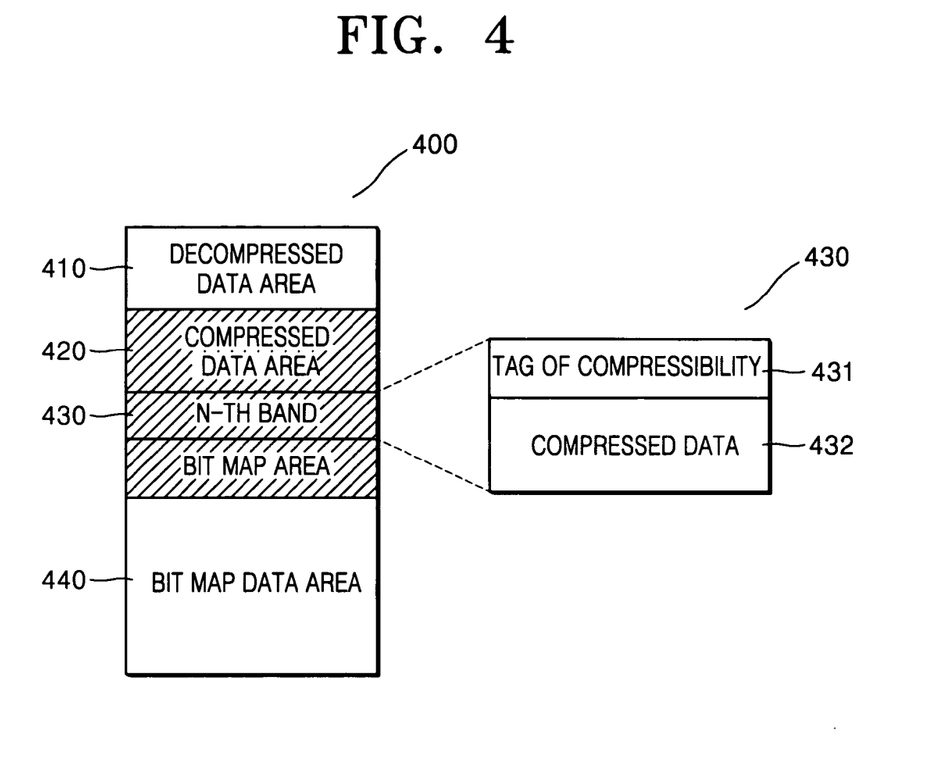
FIG. 4 is a diagram illustrating a structure of a memory map example using a hardware method according to an embodiment of the present invention.
Figure 5:
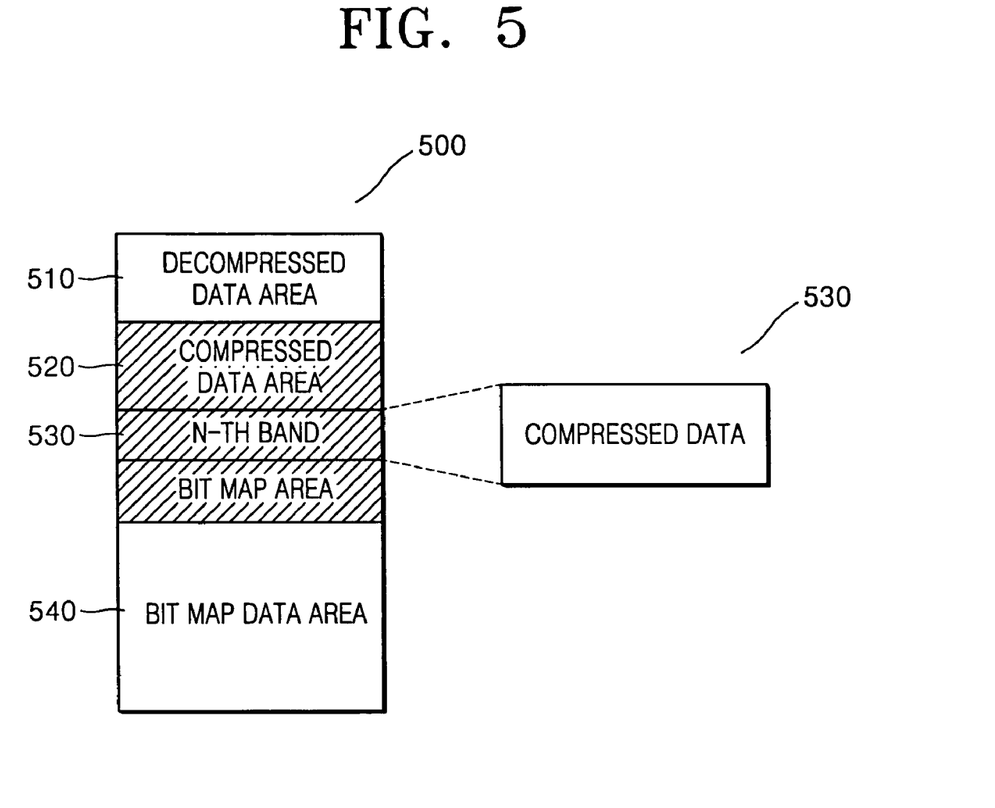
FIG. 5 is a diagram illustrating a structure of a memory map example using a software method according to an embodiment of the present invention.

FIGS. 4 and 5 illustrate memory maps and formats of the compressed data stored using the hardware method and the software method, respectively.

Referring to FIGS. 4 and 5, each memory 220 includes a bit map data area 440 and 540, a compressed data area 420 and 520, and a decompressed data area 410 and 510.

The bit map data areas 440 and 540 store the bit map data as raw data transmitted from the host PC 200.

The compressed data areas 420 and 520 store the bit map data compressed in a band unit in the compression section. Reference numerals 430 and 530 denote the compressed Nth band areas, respectively.

The decompressed data areas 410 and 510 store the bit map data decompressed in a band unit in the decompression section.

In the hardware method shown in FIG. 4, the compressed Nth band data 430 has a tag 431, including information on the compressibility, and the compressed data 432 of a band unit.

In the software method shown in FIG. 5, as the information on the compressibility is stored in the inner register (not shown) in the compression section, the compressed Nth band data 530 does not have a tag.

Referring again to FIG. 3, when the printing operation of the printer engine is started at step S300, the buffer size controller 205 reads out the compressibility of the present compressed band to be decompressed at step S301. The information on the compressibility of a band can be obtained by using one of the hardware method or the software method described above.

The buffer size controller 205 then allocates the first buffer 201 and the second buffer 208 to the compression section and the decompression section on the basis of the information on the compressibility at step S302.

Therefore, the allocation of areas of the first buffer 201 and the second buffer 208 to the compression section or the decompression section depends upon the situation. However, minimum threshold values of the first buffer 201 and the second buffer 208 should be established to avoid detrimental effects created by excessively allocating areas of each. Therefore, these values can be determined through performing the data compression and decompression, or through performing a simulation.

The buffer size controller 205 continuously checks the existence of the bit map data stored in the memory 220 to be compressed at step S303, and if further bit map data to be compressed exists, the flow is restored to step S301, thereby allowing the compression to be continuously performed.

If further bit map data to be compressed does not exist, the buffer size controller 205 can then allocate the overall areas of the first buffer 201 and the second buffer 208 to the decompression section, specifically, the decompression core 207 at step S304.

The buffer size controller 205 then continuously checks the state of the printing operation by the printer engine at step S305, and continuously allocates the overall areas of the first buffer 201 and the second buffer 208 when the printing operating is being performed.

As noted in the aforementioned flowchart description, when the printing operation is not yet started and only the transmission of data from the host PC 200 is being performed, the compression section uses the overall areas of the first buffer 201 and the second buffer 208. When the transmission of data from the host PC 200 is not performed and only the printing operation by the printer engine is being performed, the decompression section uses the overall areas of the first buffer 201 and the second buffer 208.

When the transmission of data from the host PC 200 and the printing operation by the printer engine are simultaneously performed, some areas of the first buffer 201 and the second buffer 208 are allocated to the compression section and the other areas thereof are allocated to the decompression section in accordance with the data compressibility.

In this case, when the data compressibility is small, the decompression section uses most areas of the first buffer 201 and the second buffer 208, such that the performance of the compression section may be deteriorated. Therefore, the minimum threshold value to be used in the decompression section, that is, the minimum area sizes of the first buffer 201 and the second buffer 208, should be established. These threshold values can be controllable in the software, and can be established to have the optimum performance through experiments.

While the present invention has been particularly shown and described with reference to exemplary embodiments thereof, it will be understood by those skilled in the art that various changes in form and details can be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A data compression and decompression unit of a printer, wherein the printer includes a compression section that receives bit map data, compresses the bit map data with a predetermined compressibility, and generates compressed data; a decompression section that decompresses the compressed data into an original format, and generates decompressed data; a memory section that stores the bit map data, the compressed data, and the decompressed data, comprising:

a first buffer and a second buffer shared by the compression section and the decompression section, wherein each of the first and second buffer temporarily stores the bit map data, the compressed data or decompressed data in a predetermined allocation area according to control of a control section;

a control section that dynamically allocates areas of the first buffer and the second buffer in accordance with the predetermined compressibility, wherein the first buffer temporarily stores the bit map data read from the memory for compressing, or the compressed data read from the memory for decompressing, and the second buffer temporarily stores the compressed data or the decompressed data before storing the compressed data or the decompressed data to the memory, wherein the control section allocates a substantially entire part of the first and second buffer to the compression section when a printing operation of a printer engine is not yet started, allocates a part of the first buffer and a part of the second buffer to the compression section and the decompression section in accordance with the predetermined compressibility when a printing operation is being performed, and allocates a substantially entire part of the first and second buffer to the decompression section when no bit map data is being transmitted from a terminal.

2. The data compression and decompression unit according to claim 1, further comprising a direct memory access (DMA) controller, wherein the direct memory access controller transmits data between the decompression section and the memory section by using a direct memory access (DMA) method.

3. The data compression and decompression unit according to claim 1, wherein the first buffer and the second buffer are first-in first-out (FIFO) buffers.

4. The data compression and decompression unit according to claim 1, wherein the control section reads out the predetermined compressibility, and allocates a part of the first buffer and a part of the second buffer to the compression section and the decompression section in accordance with the predetermined compressibility.

5. The data compression and decompression unit according to claim 4, wherein the allocation of the first buffer and the second buffer is carried out each time the data compressed in a band unit is decompressed.

6. The data compression and decompression unit according to claim 4, wherein the predetermined compressibility comprises a compression ratio of the bit map data stored in the memory section and the compressed data.

7. The data compression and decompression unit according to claim 6, wherein the predetermined compressibility is added to a tag in a header portion of the compressed data.

8. The data compression and decompression unit according to claim 6, wherein the predetermined compressibility is stored in a storage portion of a compression section of the compressed data.

9. The data compression and decompression unit according to claim 6, wherein the predetermined compressibility is read out from a tag positioned in a header portion of the compressed data.

10. The data compression and decompression unit according to claim 6, wherein the predetermined compressibility is read out from the storage portion of the compression section of the compressed data.

11. The data compression and decompression unit according to claim 1, wherein the first buffer and the second buffer are first-in first-out (FIFO) buffers.

12. A method to enhance data throughput during compression and decompression of data, comprising the steps of: storing bit map data in a memory section; calculating a predetermined compressibility to at least one of compress and decompress the stored bit map data, and a compressed data;

dynamically allocating areas of a first buffer and a second buffer to a compression section and a decompression section according to the calculated predetermined compressibility;

reading out the bit map data stored in the memory section, storing temporarily the read-out bit map data in the allocated area of the first buffer, compressing the read-out bit map data in a band unit in accordance with the predetermined compressibility, storing temporarily the compressed data in the allocated area of the second buffer, and then storing the compressed data in the memory section;

reading out the compressed data stored in the memory section, storing temporarily the read-out compressed data in the allocated area of the first buffer, decompressing the compressed data stored in the memory section in accordance with the predetermined compressibility, and generating decompressed data, storing temporarily the compressed data in the allocated area of the second buffer, and then storing the decompressed data in the memory section, wherein the first buffer and the second buffer shared by the compression section and the decompression section according to control of a control section.

wherein the control section allocates a substantially entire part of the first and second buffer to the compression section when a printing operation of a printer engine is not yet started, allocates a part of the first buffer and a part of the second buffer to the compression section and the decompression section in accordance with the predetermined compressibility when a printing operation is being performed, and allocates a substantially entire part of the first and second buffer to the decompression section when no bit map data is being transmitted from a terminal.

13. The method to enhance data throughput during compression and decompression of data according to claim 12, further comprising:

receiving the compressed data from the memory section and storing the received compressed data in the allocated part of the first buffer;

decompressing the compressed data from the first buffer and storing the decompressed data in the allocated part of the second buffer; and storing the decompressed data in the memory section.

14. The data compression and decompression unit according to claim 1, further comprising a compression core that reads out the bit map data stored in the first buffer, and generates the compressed data with the predetermined compressibility.

15. The data compression and decompression unit according to claim 1, further comprising:

a decompression core that decompresses the compressed data stored in the first buffer, and generates the decompressed data.

16. The method to enhance data throughput during compression and decompression of data according to claim 12, further comprising:

calculating a predetermined compressibility between the compressed data stored in the memory unit and the bit map data; and adding the calculated compressibility to the compressed data.

* * * * *